(12) United States Patent
Fischmann T.

(10) Patent No.: US 8,465,651 B2
(45) Date of Patent: Jun. 18, 2013

(54) SUSTAINABLE METHOD AND SYSTEM FOR TREATING WATER BODIES AFFECTED BY BACTERIA AND MICROALGAE AT LOW COST

(75) Inventor: Fernando Fischmann T., Santiago (CL)

(73) Assignee: Crystal Lagoons (Curacao) B.V., Curacao (NL)

( * ) Notice: Subject to any disclaimer, the term of this patent is extended or adjusted under 35 U.S.C. 154(b) by 0 days.

(21) Appl. No.: 13/136,458

(22) Filed: Aug. 1, 2011

(65) Prior Publication Data
US 2012/0024796 A1    Feb. 2, 2012

Related U.S. Application Data

(60) Provisional application No. 61/469,548, filed on Mar. 30, 2011.

(51) Int. Cl.
*C02F 1/56*    (2006.01)

(52) U.S. Cl.
USPC .................. 210/747.5; 210/167.11; 210/709; 210/721; 210/742; 210/743; 210/753

(58) Field of Classification Search
None
See application file for complete search history.

(56) References Cited

U.S. PATENT DOCUMENTS

| | | |
|---|---|---|
| 2,071,520 A | 2/1937 | Harrison |
| 2,141,811 A | 12/1938 | Everson |
| 2,314,767 A | 3/1943 | Burrell |
| 2,646,889 A | 7/1953 | August |
| 2,923,954 A | 2/1960 | Babcock |

(Continued)

FOREIGN PATENT DOCUMENTS

| | | |
|---|---|---|
| CN | 1256250 | 6/2000 |
| DE | 2 141 460 | 2/1973 |

(Continued)

OTHER PUBLICATIONS

International Search Report and Written Opinion for International Application No. PCT/US2011/051129 mailed Feb. 8, 2012.

(Continued)

*Primary Examiner* — Tony G Soohoo
*Assistant Examiner* — Peter Keyworth
(74) *Attorney, Agent, or Firm* — Merchant & Gould P.C.

(57) ABSTRACT

A sustainable method and system for treating and maintaining bodies of water at low cost for low density recreational use is disclosed. A system of the invention generally includes at least one containing means, at least one coordination means, at least one chemical application means, at least one non-intrusive mobile suction means, and at least one filtration means. The coordinating means can receive information regarding water quality parameters that are controlled, and can timely activate the processes necessary to adjust the water quality parameters within their respective limits. The disclosed methods and system filter only a small fraction of the total water volume, up to 200 times less per day than the flow filtered by conventional swimming pool filtration systems. The disclosed methods and system also use less chemicals, up to 100 times less than conventional swimming pool water treatment systems. The methods and system of the present invention can be used to treat recreational water bodies affected by bacteria and microalgae and provide sustainable methods for producing water that complies with bacteriological and physicochemical requirements for recreational water, as set forth by governmental regulatory agencies such as the Environmental Protection Agency (EPA), for bathing with full body contact.

22 Claims, 1 Drawing Sheet

U.S. PATENT DOCUMENTS

| | | | |
|---|---|---|---|
| 3,317,925 A | 5/1967 | Vance | |
| 3,406,416 A | 10/1968 | Presby et al. | |
| 3,412,862 A | 11/1968 | Chaplin | |
| 3,419,916 A | 1/1969 | Schankler | |
| 3,470,091 A | 9/1969 | Budd et al. | |
| 3,540,274 A | 11/1970 | Shore | |
| 3,641,594 A | 2/1972 | Hough | |
| 3,660,957 A | 5/1972 | Schankler | |
| 3,695,434 A | 10/1972 | Whitten, Jr. | |
| 3,748,810 A | 7/1973 | Mattingly | |
| 3,788,982 A | 1/1974 | Zsoldoes, Jr. et al. | |
| 3,844,760 A | 10/1974 | Nelson | |
| 3,950,809 A | 4/1976 | Schatzmann | |
| 4,090,266 A | 5/1978 | Price | |
| 4,100,641 A | 7/1978 | Pansini | |
| 4,119,535 A | 10/1978 | White | |
| 4,129,904 A | 12/1978 | Pansini | |
| 4,176,058 A | 11/1979 | Grobler | |
| 4,254,525 A | 3/1981 | Combest | |
| 4,254,818 A | 3/1981 | Melamed | |
| 4,263,759 A | 4/1981 | Miller | |
| 4,304,022 A | 12/1981 | Sommer | |
| 4,338,697 A | 7/1982 | Broadwater | |
| 4,343,696 A | 8/1982 | Hung | |
| 4,402,101 A | 9/1983 | van Zyl | |
| 4,519,914 A | 5/1985 | Etani | |
| 4,581,075 A | 4/1986 | St. Martin | |
| 4,640,784 A | 2/1987 | Cant | |
| 4,652,378 A | 3/1987 | Marikovsky et al. | |
| 4,692,956 A | 9/1987 | Kassis | |
| 4,752,740 A | 6/1988 | Steininger | |
| 4,767,511 A * | 8/1988 | Aragon | 210/743 |
| 4,776,053 A | 10/1988 | Kiraly | |
| 4,835,810 A | 6/1989 | Hugo | |
| 4,849,024 A | 7/1989 | Supra | |
| 4,880,547 A | 11/1989 | Etani | |
| 4,889,622 A | 12/1989 | Newcombe-Bond | |
| 4,948,296 A | 8/1990 | Salter | |
| 4,952,398 A | 8/1990 | Tapin | |
| 5,028,321 A | 7/1991 | Stone et al. | |
| 5,039,427 A | 8/1991 | Conover | |
| 5,106,229 A | 4/1992 | Blackwell | |
| 5,107,872 A | 4/1992 | Meincke | |
| 5,108,514 A | 4/1992 | Kisner | |
| 5,143,623 A | 9/1992 | Kroll | |
| 5,172,445 A | 12/1992 | Chandler | |
| 5,245,723 A | 9/1993 | Sommer | |
| 5,293,659 A | 3/1994 | Rief et al. | |
| 5,337,434 A | 8/1994 | Erlich | |
| 5,346,566 A | 9/1994 | White | |
| 5,398,361 A | 3/1995 | Cason | |
| 5,454,129 A | 10/1995 | Kell | |
| 5,662,940 A | 9/1997 | Hight et al. | |
| 5,802,631 A | 9/1998 | Friedman | |
| 5,842,243 A | 12/1998 | Horvath et al. | |
| 5,985,156 A | 11/1999 | Henkin et al. | |
| 6,017,400 A | 1/2000 | Clark et al. | |
| 6,149,819 A | 11/2000 | Martin et al. | |
| 6,228,272 B1 * | 5/2001 | Gola | 210/742 |
| 6,280,639 B1 | 8/2001 | Ortiz | |
| 6,284,144 B1 | 9/2001 | Itzhak | |
| 6,303,038 B1 | 10/2001 | Sanders et al. | |
| 6,317,901 B1 | 11/2001 | Corpuel | |
| 6,409,926 B1 | 6/2002 | Martin | |
| 6,419,840 B1 | 7/2002 | Meincke | |
| 6,444,176 B1 | 9/2002 | Yoshinaga et al. | |
| 6,539,573 B1 | 4/2003 | Caccavella | |
| 7,252,843 B2 | 8/2007 | Moore et al. | |
| 7,820,055 B2 | 10/2010 | Fischmann Torres | |
| 7,862,712 B2 | 1/2011 | Tak | |
| 2002/0117430 A1 * | 8/2002 | Navarro et al. | 210/85 |
| 2003/0091467 A1 | 5/2003 | Kmec et al. | |
| 2003/0094421 A1 | 5/2003 | Gargas | |
| 2003/0228195 A1 | 12/2003 | Mizutani | |
| 2004/0025269 A1 | 2/2004 | Pichon | |
| 2004/0129644 A1 | 7/2004 | Unhoch | |
| 2004/0211450 A1 | 10/2004 | Stoltz | |
| 2004/0217326 A1 | 11/2004 | Souter et al. | |
| 2004/0226896 A1 | 11/2004 | Lovestead et al. | |
| 2006/0054568 A1 | 3/2006 | Jones et al. | |
| 2006/0169322 A1 | 8/2006 | Torkelson | |
| 2006/0174430 A1 | 8/2006 | Pareti | |
| 2007/0059562 A1 | 3/2007 | Hattori et al. | |
| 2007/0181498 A1 | 8/2007 | Kaas | |
| 2008/0116142 A1 | 5/2008 | Fischmann Torres | |
| 2009/0050572 A1 | 2/2009 | McGuire et al. | |
| 2010/0320147 A1 | 12/2010 | McGuire et al. | |
| 2011/0061194 A1 | 3/2011 | Fischmann Torres | |
| 2011/0062067 A1 | 3/2011 | Fischmann Torres | |
| 2011/0210076 A1 | 9/2011 | Fischmann Torres | |

FOREIGN PATENT DOCUMENTS

| | | |
|---|---|---|
| DE | 19515428 | 11/1996 |
| DE | 297 16 994 | 1/1998 |
| DE | 198 14 705 | 10/1998 |
| DE | 198 60 568 | 12/1998 |
| EP | 0 352 487 | 1/1990 |
| EP | 0 468 876 | 1/1992 |
| EP | 0 483 470 | 5/1992 |
| EP | 1 420 130 | 5/2004 |
| EP | 168 85 62 | 8/2006 |
| ES | 200 14 29 | 5/1998 |
| FR | 2 544 005 | 10/1984 |
| FR | 2 668 527 | 4/1992 |
| FR | 2 685 374 | 6/1993 |
| FR | 2 740 493 | 4/1997 |
| FR | 2 785 898 | 5/2000 |
| GB | 1494005 | 12/1977 |
| GB | 2045606 | 11/1980 |
| GB | 2 243 151 | 10/1991 |
| JP | 59-012287 | 1/1984 |
| JP | 59-222294 | 12/1984 |
| JP | 4-115008 | 4/1992 |
| JP | 5-220466 | 8/1993 |
| JP | 5-261395 | 10/1993 |
| JP | 7-310311 | 11/1995 |
| JP | 3026643 | 1/1996 |
| JP | 10-169226 | 6/1998 |
| JP | 2001-3586 | 1/2001 |
| JP | 2001-9452 | 1/2001 |
| JP | 2002-90339 | 3/2002 |
| JP | 2002-282860 | 10/2002 |
| JP | 2003-190989 | 7/2003 |
| JP | 2003-200173 | 7/2003 |
| JP | 2004-958 | 1/2004 |
| JP | 2005-288392 | 10/2005 |
| JP | 2006-68624 | 3/2006 |
| JP | 2007-500073 | 1/2007 |
| JP | 2011-5463 | 1/2011 |
| KR | 20-0162956 | 9/1999 |
| TW | 432013 | 8/1987 |
| TW | 482186 | 12/1990 |
| WO | WO 8101585 | 6/1981 |
| WO | WO 9848132 | 10/1998 |
| WO | WO 03/010388 | 2/2003 |
| WO | WO 2006069418 | 7/2006 |
| WO | WO 2007029277 | 3/2007 |
| WO | WO 2007/059562 | 5/2007 |
| WO | WO 2009/114206 | 9/2009 |
| WO | WO 2010/074770 | 7/2010 |

OTHER PUBLICATIONS

International Search Report and Written Opinion for International Application No. PCT/US2011/051236 mailed Jan. 26, 2012.
International Search Report and Written Opinion for International Application No. PCT/US2011/051244 mailed Jan. 25, 2012.
World Health Organization: Guidelines for safe recreational waters. vol. 2. Swimming pools and similar recreational water environments. Switzerland. Jun. 27, 2006 ISBN 92-4-154680-8 Chapter 4.
World Health Organization: Guidelines for safe recreational waters. vol. 2. Swimming pools and similar recreational water environments. Switzerland. Jun. 27, 2006 ISBN 92-4-154680-8 Chapter 5.
International Search Report mailed May 6, 2009, in co-pending related PCT Application No. PCT/US2009/036809.
Singapore Office Action for corresponding application No. 200717963-3 dated Dec. 23, 2010.

Second Singapore Office Action for corresponding application No. 200717963-3 dated Dec. 23, 2010.

Pakistan Examination Report.

African Regional Intellectual Property Organization (ARIPO) report for corresponding application No. AP/P/2007/004242 dated Dec. 7, 2010.

Japanese Office Action for corresponding application No. 2007-299975 dated May 31, 2011—translation provided.

Peruvian Technical Report for corresponding application No. 000244-2007 dated Sep. 2, 2010—translation provided.

Office Action for corresponding U.S. Appl. No. 12/884,842 mailed Mar. 1, 2011.

Office Action for corresponding U.S. Appl. No. 12/884,872 mailed Mar. 1, 2011.

European Search Report from European Application No. 07 07 5995 mailed Mar. 9, 2010.

Norwegian Search Report from Norwegian Application No. 20075880 dated Feb. 4, 2010.

Panama Search Report from Panama Application No. 87176-01 dated Mar. 17, 2010.

Panama Search Report from Panama Application No. 88509-01 dated Oct. 7, 2010.

Chilean Examiner's report from Application No. 3900-08 issued Aug. 31, 2009.

Non-Final Office Action mailed Apr. 19, 2012 from U.S. Appl. No. 13/195,695.

Final Office Action mailed Nov. 28, 2011 from U.S. Appl. No. 13/076,151.

Non-Final Office Action mailed Apr. 24, 2012 from U.S. Appl. No. 13/136,474.

Restriction Requirement Office Action mailed Jan. 13, 2012 from U.S. Appl. No. 13/136,474.

"Ambient Water Quality Criteria for Bacteria—1986", Jan. 1986, United States EPA, EPA440/5-84-002, p. 16.

\* cited by examiner

SUSTAINABLE METHOD AND SYSTEM FOR TREATING WATER BODIES AFFECTED BY BACTERIA AND MICROALGAE AT LOW COST

This application claims benefit of U.S. Provisional Ser. No. 61/469,548, filed 30 Mar. 2011 and which application is incorporated herein by reference. To the extent appropriate, a claim of priority is made to the above disclosed application.

FIELD OF THE INVENTION

The present invention is related to a sustainable method and system for treating and maintaining bodies of water at low cost for low density recreational use. Typically, the density of usage is up to 0.05 bathers per cubic meter of water volume. Unlike conventional swimming pool filtration systems in which all of the water volume is filtered up to 6 times per day, the methods and system disclosed herein filter only a small fraction of the total water volume, up to 200 times less per day than the flow filtered by conventional swimming pool filtration systems. The methods and system disclosed herein also use less chemicals, up to 100 times less than conventional swimming pool water treatment systems. The methods and system of the present invention can be used to treat recreational water bodies affected by bacteria and microalgae and provide sustainable methods for producing water that complies with bacteriological and physicochemical requirements for recreational water, as set forth by governmental regulatory agencies such as the Environmental Protection Agency (EPA), for bathing with full body contact.

BACKGROUND

Diverse recreational bodies of water are prone to be affected by bacteria and microalgae proliferation. In cases where the quality of water is of great importance, like swimming pools, high quality water suitable for swimming is achieved by adding large amounts of chemical agents. In swimming pools, for example, chemical agents are added to the water in the pool in order to maintain at least a 1.5 ppm permanent concentration of chlorine agents in the water. This concentration is required due to the strict swimming pool regulations regarding the water's bacteriological and physicochemical properties, and it is achieved by maintaining a permanent Oxidation Reduction Potential (ORP) on the water of at least 650 mV on a continuous basis.

Many countries throughout the world have regulations regarding recreational waters and there are generally two types of regulations regarding recreational use of such water bodies. The first type of regulation is directed to swimming pools, which essentially requires the maintenance of a high permanent chlorine buffer in order to avoid the contamination of the water when new bathers enter the swimming pool. The chlorine buffer neutralizes contaminants and kills microorganisms brought to the swimming pool water by bathers, thus maintaining a high water quality suitable for recreational purposes.

The second type of regulation applies to lakes and the sea, and is referred to as the criteria for bathing with full body contact for recreational waters. This regulation is based on the diluting power of water. When new bathers enter a body of water, the contaminants are diluted in such a way that the contaminants do not attain a concentration in the body of water that causes significant effects. Therefore, in a large water body such as a lake or sea, a disinfectant buffer is not needed due to the high diluting power of the large water volume.

There is a global trend towards more sustainable and environmentally conscious systems in all aspects of life that can coexist with the environment leaving the smallest footprint behind. Nevertheless, when it comes to the treatment of recreational bodies of water, there have not been substantial advances towards environmentally responsible methods and systems. Usual treatments regarding the proliferation of bacteria and microalgae in swimming pools require high amounts of chemicals and energy, which does not fulfill today's sustainable necessities.

In order to comply with the first regulation, a chlorine buffer in swimming pools must be maintained on a continuous basis to neutralize the contaminants brought into the pool by new bathers. Maintaining a permanent chlorine buffer in the traditional treatment of swimming pools is related to maintaining an ORP level of at least 650 mV on a continual basis. Once demand for chlorine disinfecting has been satisfied, the free chlorine concentration remaining in the water, i.e. the residual chlorine, acts as a buffer in order to provide disinfection when new organic matter or microorganisms enter the body of water, for example, when new bathers enter into the water. The amount of chemicals used to permanently maintain an ORP level of at least 650 mV is very high, significantly increases the operational costs of the pool, involves the use of chemicals in amounts that are not environmentally friendly and can generate undesirable disinfection by-products (DBP's), such as chloramines.

Additionally, a typically configured swimming pool requires the filtration of its entire volume of water usually from 1 to 6 times per day. This is achieved by using a traditionally configured centralized filtration unit. Thus, the filtration system of traditional swimming pools consumes large amounts of energy, and also imposes high demands in terms of installation, operation and maintenance costs.

In sum, traditional swimming pools depend on large amounts of chemicals to maintain a chlorine buffer in order to neutralize the contamination entering the water body and a centralized filtration system that filters the whole volume of water usually from 1 to 6 times per day. Thus, traditional swimming pool technology has high operational and maintenance costs due to the high disinfectant concentrations that have to be continuously maintained and the required centralized filtration system. There is a great need for a sustainable, low energy method and system for treating and maintaining large water volumes for recreational purposes using a small amount of chemicals.

Swimming Pools

The consumption of nutrients in water by aerobic microorganisms results in a high demand of oxygen. This in turn, lowers the levels of dissolved oxygen in the water, and thus, allows the development of anaerobic microorganisms. Further development of anaerobic microorganisms produces accumulation of organic compounds. This chain of events produces an accumulation of nutrients in water, which can serve as a culture broth for particular microorganisms. Among the microorganisms developed in these conditions, bacteria and microalgae are the most relevant in recreational water bodies.

The turbidity in recreational bodies of water is produced mainly by microalgae present in the water. These microorganisms grow in water with a determined concentration of nutrients. Depending on the availability of a light source and the concentration of nutrients, algal blooms can occur in a process called eutrophication in which the algae populates the whole volume of water turning the whole body of water into a huge source of biomass and increases the turbidity of the water. Different regulations indicate that values of up to 50 nephelometric turbidity units (NTU) would be safe for human health. In British Columbia, for example, water turbidity determined by the Environmental Protection Division of the Ministry of Environment for recreational bodies of water, establishes an upper limit of 50 NTU (Section 2(e) of the Environment Management Act, 1981 of British Columbia, Canada), whereas the South Australian government considers an upper value of 25 NTU. When dissolved nutrients required for the maintenance of microalgae are consumed, the microalgae die and settle to the bottom of the body of water. The available organic matter in this settled layer at the bottom of the body of water can again serve as basis for the development of anaerobic microorganisms in the water, which in general pose health threats for humans. In artificial bodies of water, the quality of water deteriorates progressively as a consequence of microalgae and bacteria growth. In typical methods or processes for water treatment of swimming pools with high density of bathers, large amounts of disinfectant agents, such as chlorine, together with the filtration of the entire volume of water are used to control the proliferation of bacteria and microalgae. For example, if chlorine is used, it will react with organic matter as well as with reducing agents such as hydrogen sulfide, ferrous ions, manganous ions, and nitrite ions. The chlorine consumed in these reactions is defined as the chlorine demand. To meet the chlorine demand, permanent ORP levels of at least 650 mV have to be maintained in the water.

Reaction of chlorine with the organic compounds present in the water can form several toxic by-products or disinfection by-products (DBP). For example, the reaction of chlorine with ammonia can produce chloramines as undesired by-products. Further reaction of chlorine or chloramines with organic matter can produce trihalomethanes, which have been implicated as potential carcinogens. Also, depending on the disinfection method, new DBPs have been identified, such as iodinated trihalomethanes, haloacetonitriles, halonitromethanes, haloacetaldehydes, and nitrosamines. Furthermore, exposure of bathers to chlorine and organic matter has been suggested as contributing to respiratory problems, including asthma, and several other health problems.

The use of chemical agents also poses an environmental problem related to the accumulation and the disposal of these chemicals and DBPs in the environment. Therefore, a reduction in the use of such chemicals and the resultant DBPs would be beneficial.

In addition to the high cost and health and environmental issues associated with chemical treatment, conventional filtration systems have high capital costs and energy consumption. Traditional treatments of standard sized swimming pools require the filtration of the whole volume of water, usually from 1 to 6 times a day using a traditionally configured centralized filtration unit. This type of system imposes a high demand on energy supply, as well as elevated capital costs associated with the filtration system such as piping, pumps, filters, and facilities, among others.

STATE OF THE ART

U.S. Pat. No. 5,143,623 describes a nutrient removal method, wherein the descending particles are collected while descending in the body of water by a structure having funnel shaped collectors and the structure can have the size of 1 acre (4,046 square meters). Said structure must stay in place for a prolonged period of time of at least a "few hours" in order to receive the descending particles, and furthermore, comprises a surface equal to the surface of the structure containing the body of water. The structure disclosed in U.S. Pat. No. 5,143,623 is intrusive as it does not allow for the normal development of aquatic activities and does not allow cleaning the bottom of the structure, thus it cannot provide desired color properties. Moreover, the method does not include the use of disinfectant agents or a filtration system.

Another document, WO2009114206 describes a method for algal removal from eutrophic water by using a settling pond and dosing different coagulants. This method requires the construction of at least one settling pond, and preferentially, at least 2 settling ponds and the amount of cationic coagulants used is up to 150 ppm. WO2009114206 requires the construction of more than one pond for its method to work properly, which requires more land and presents higher costs. The method disclosed by WO2009114206 does not disclose coordinated operation of the system and applies high amounts of coagulants in a manner that is not environmentally friendly.

FR2785898 describes a purification system for swimming pool water, comprising filtration, sterilization and pH control. The amount of chemical agents and the energy supplied to the traditionally configured centralized filtration system and the ionization process are similar to the amounts and filtration used for standard swimming pool technology. FR2785898 uses a high amount of chemicals to maintain a continuous concentration of the chemicals in the water. The method in FR2785898 also comprises filtration over the whole water volume, therefore demanding high amounts of energy and requiring expensive filtration equipment.

U.S. Pat. No. 7,820,055 is directed to obtaining large bodies of water for recreational use, and describes a process for installing and maintaining large volumes or bodies of water for recreational purposes, such as lakes or artificial lagoons with excellent coloration, high transparency and clarity similar to those of pools or tropical seas at low cost, especially for bodies of water larger than 15,000 $m^3$. U.S. Pat. No. 7,820,055 defines structural features such as skimmers for oil elimination, water collection systems, building details, types and colors of liners, circulation systems and additive injection, requirements for supplying water, pH measuring, addition of salts, use of flocculants, change of the rates of fresh water, additives and oxidation processes, and a suctioning vehicle driven by a boat. U.S. Pat. No. 7,820,055 describes an open system for water circulation but does not employ filtration or a coordinated method that applies an algorithm depending on the water's temperature to maintain water quality according to its real needs.

WO2010/074770A1 describes an efficient filtration process to maintain recreational and ornamental bodies of water. WO2010/074770A1 requires the application of ultrasound waves to the water, and application of flocculants. WO2010/074770A1 does not disclose a coordination means that coordinates the method operation, and therefore imposes high energy demands.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention provides a sustainable method and system for treating and maintaining large bodies of water for low density of bathers for recreational use. The density of bathers in the water body is up to 0.05 bathers or less per cubic meter, which is about 10 times lower than the density considered in the design of traditional swimming pools. By lowering the density of bathers, it is possible to use the diluting power of the water to maintain high quality water suitable for full contact bathing without the need to maintain a permanent chlorine buffer as in a conventional swimming pool. Thus, the present methods and system of the invention break the size barrier of conventional swimming pools and provide ecologic pools of very large dimensions, similar to high clarity lakes, that have high water quality associated with conventional swimming pools. These ecologic pools are not economically feasible using conventional swimming pool filtration technologies.

The methods and system described herein eliminate the chlorine buffer used in conventional swimming pool filtration systems. The amount of chemicals used is therefore very low compared to conventional swimming pool water treatment systems. Unlike current swimming pool water treatments, the methods and system of the invention do not require the ORP levels to be permanently maintained. In the methods and system described herein, ORP levels of at least 500 mV are maintained for a period of time determined by an algorithm that depends on the temperature of the water body. Thus, the present invention provides methods and a system capable of adjusting the amount and dosing of chemicals in response to environmental factors, such as water temperature, reducing the amount of chemicals by up to 100 times compared to traditional treatments of swimming pools.

In addition, the methods and system disclosed herein comprise a low cost filtration means, which allows the filtering of only a small fraction of the entire volume of water, up to 200 times smaller than for conventional swimming pools. Since a traditional centralized filtration unit is not employed, energy consumption and equipment costs may be up to 50 times less in the present invention than in traditionally configured swimming pool filtration systems.

Thus, the present invention may offer several advantages over traditional swimming pool filtration technology. The present invention employs an algorithm that adjusts the dosing and application of disinfectants to the water body in order to maintain an ORP level of at least 500 mV for a period of time that depends on the water's temperature, allowing a reduction in the amount of chemicals used of at least one order of magnitude compared to traditional swimming pool filtration systems. Advantages associated with decreasing the amount of chemicals include reduced operation costs and a reduction on the production of DBPs, which may be harmful to the environment and bathers. In addition, the use of a low cost filtration system that filters a small fraction of the total volume of water reduces installation costs, operating costs, and energy usage compared to conventional swimming pool filtration systems.

The present invention addresses diverse environmental problems that arise in processes for treating water affected by bacteria and microalgae. The inventor of the novel technology disclosed herein, Mr. Fernando Fischmann, has developed many new advances in water treatment technology that are rapidly being adopted throughout the world. In a short period of time, the inventor's technologies related to recreational crystalline lagoons have been incorporated into more than 180 projects throughout the world. The inventor and his advancements in water treatment technology have been the subject of more than 2,000 articles, as can be seen at http://press.crystal-lagoons.com/. The inventor has also received important international awards for innovation and entrepreneurship related to these advances in water treatment technology and has been the subject of interviews by major media outlets including CNN, BBC, FUJI, and Bloomberg's Businessweek.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURES

The accompanying drawings, which are incorporated in and constitute a part of this disclosure, illustrate various embodiments of the present invention. In the drawings.

DETAILED DESCRIPTION OF THE INVENTION

The following detailed description refers to the accompanying drawings. While embodiments of the invention may be described, modifications, adaptions, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention. While systems and methods are described in terms of "comprising" various apparatus or steps, the systems and methods can also "consist essentially of" or "consist of" the various apparatus or steps, unless stated otherwise.

DEFINITIONS

In the light of the present disclosure, the following terms or phrases should be understood with the meanings described below:

The term "swimming pool regulations" as used herein means regulations directed to swimming pools which require the maintenance of a permanent chlorine buffer in order to avoid the contamination of the water when new bathers enter the swimming pool. The chlorine buffer neutralizes contaminants and kills microorganisms brought to the swimming pool water by bathers, thus maintaining a high water quality suitable for recreational purposes. These types of regulations are generally established by a governmental body or agency.

The term "chlorine buffer" as used herein means the residual chlorine concentration in a swimming pool or any other body of water required by the swimming pool regulations. The amount of active chlorine acts as a buffering mechanism when new microorganisms or organic matter enters the water, thus neutralizing the organic matter and killing the microorganisms in such a way that the organic matter can no longer be used as nutrients for other microorganisms to consume. The chlorine buffer can relate to the ORP levels in the water, which will be controlled according to the present invention. It is to be understood that another disinfectant could be used instead of chlorine, such as bromine, in order to maintain the required disinfectant levels.

The term "traditionally configured centralized filtration system" as used herein is to be understood as meaning a centralized filtration unit or system with a capacity designed to filter the whole volume of water of the swimming pool, usually from 1 to 6 times a day, in order to comply with the swimming pool regulations. The water sent to the centralized filtration system is collected from different sources, such as drains, skimmers, or by overflow, among others.

The terms "container" or "containing means" are used generically herein to describe any large artificial body of water, encompassing terminology such as artificial lagoons, artificial lakes, artificial ponds, pools, and the like, having large dimensions.

The term "non-intrusive cleaning system" as used herein includes a suction means which does not interfere with the normal development of recreational activities in the water. Generally, the suction means is able to travel across the bottom surface of the containing means and suction settled material. For example a boat pulling a suctioning cart is a non-intrusive system, given that the permanence of this system is temporal in a zone of the water body. A self-propelled suctioning cart would also be non-intrusive. Nevertheless, a system requiring fixed installations or fixed piping would be intrusive for the normal development of water sports or other activities.

The term "coordination means" is used generically herein to describe an automated system that is able to receive information, process it, and make a decision according to it. In a preferred embodiment of the invention, this could be done by a person, but more preferably with a computer connected to sensors.

The term "chemical application means" is used generically herein to describe a system that allows for the application or dispersion of chemicals into the water.

The term "mobile suction means" is used generically herein to describe a suctioning device that is able to travel across the bottom surface of the containing means and suction the settled material.

The term "propelling means" is used generically herein to describe a propelling device that allows providing movement, either by pushing or pulling another device.

The term "filtration means" is used generically herein to describe a filtration system that can include a filter, strainer, separator, and the like.

As used herein, the term "small fraction" corresponding to the filtered water volume means a flow of up to 200 times less than the flow filtered in a traditionally configured swimming pool filtration system.

MODES FOR CARRYING OUT THE INVENTION

Traditional swimming pool filtration methods and systems depend on the use of a chlorine buffer to neutralize contaminates and kill microorganisms entering the water body. These methods and systems require the application of chemicals in large amounts to maintain a permanent buffer independent of the real requirements of the water. In addition, these methods and systems generally require a traditionally configured centralized filtration system that filters the whole volume of water, usually from 1 to 6 times per day. Thus, traditional swimming pool technology uses a large amount of chemicals and has high capital costs and operating costs associated with the centralized filtering system.

The present invention relates to a low cost, sustainable method and system for treating and maintaining bodies of water affected by bacteria and microalgae for low density recreational use. The density of usage is up to 0.05 bathers per cubic meter. Unlike conventional swimming pool filtration systems in which the total volume of water is filtered one or more times per day, the methods and system of the present invention filter only a small fraction of the total volume of water, up to 200 times less per day compared to conventional filtration systems, providing treated water that complies with bacteriological and physicochemical regulations for recreational waters in full body contact.

The sustainable method for treating water can be performed at low costs compared to traditional water treatment systems, due to the fact that the present invention uses less chemicals and consumes less energy than traditional swimming pool water treatment systems. The methods and system of the invention do not require ORP levels of at least 650 mV to be maintained permanently as in conventional swimming pool water treatment systems. In contrast to conventional filtration systems, the methods and system described herein apply an algorithm that maintains ORP levels of at least 500 mV for a certain period of time dependent on the temperature of the water. Thus, the systems and methods of the invention provide a considerable reduction in the amount of chemicals compared to conventional swimming pool water treatments, up to 100 times less, which decreases operating and maintenance costs.

In addition, the methods and system of the invention filter only a small fraction of the total volume of water, up to 200 times less per day compared to conventional swimming pools that require a centralized filtration unit which generally filters the entire volume of water from 1 to 6 times per day. The filtering means of the methods and system of the invention comprises a smaller filtering means compared to the centralized filtration unit that operates for shorter periods of time, resulting in energy consumption and equipment costs up to 50 times less that in traditional swimming pool systems.

Figure 1:
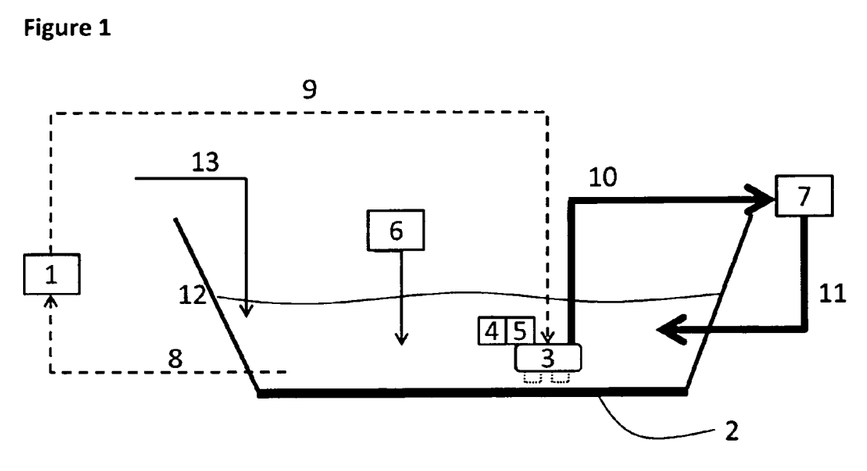
FIG. 1 is a process flow diagram illustrating a system for treating water in an embodiment of the invention.

A system of the invention generally includes at least one containing means, at least one coordination means, at least one chemical application means, at least one mobile suction means, and at least one filtration means. FIG. 1 illustrates an embodiment of a system of the invention. The system includes a containing means (12). The size of the containing means is not particularly limited, however, in many embodiments the containing means can have a volume of at least 15,000 $m^3$, or alternatively, at least 50,000 $m^3$. It is contemplated that the container or containing means can have a volume of 1 million $m^3$, 50 million $m^3$, 500 million $m^3$, or more.

The containing means (12) has a bottom able to receive bacteria, algae, suspended solids, metals, and other particles that settle from the water. In an embodiment, the containing means (12) includes a receiving means (2) for receiving the settled particles or materials from the water being treated. A receiving means (2) is fixed to the bottom of the containing means (12) and preferably is constructed of a non-porous material capable of being cleaned. The bottom of the containing means (12) is generally covered with the non-porous material allowing the non-intrusive mobile suction means (3) to travel across the entire inferior surface of the containing means (12) and suction the settled particles produced by any of the processes disclosed herein. The non-porous materials can be membranes, geo-membranes, geotextile membranes, plastic liners, concrete, coated concrete, or combinations thereof. In a preferred embodiment of the invention, the bottom of the containing means (12) is covered with plastic liners. The containing means (12) can include an inlet line (13) for feeding water to the containing means (12). The inlet line (13) allows for the refilling of the containing means (12) due to evaporation and other losses of water.

The system includes at least one coordination means (1) which can control the necessary processes depending on the system needs (e.g., water quality). Such processes can include the activation (9) of a non-intrusive mobile suction means (3). The coordinating means (1) can receive information (8) regarding the water quality parameters that are controlled, and can timely activate the processes necessary to adjust said quality parameters within their respective limits. The information (8) received by coordinating means (1) can be obtained by visual inspection, empirical methods, algorithms based on experience, by electronic detectors, or combinations thereof. Coordinating means (1) can comprise one or more people, electronic devices, or any means capable of receiving information, processing that information, and activating other processes, and this includes combinations thereof. One example of a coordination means is a computing device, such as a personal computer. Coordinating means (1) can also include sensors utilized to receive information (8) regarding the water quality parameters.

Processes are timely activated by the coordination means (1) in order to adjust the controlled parameters within their limits. The processes are activated according to the system's needs, which allows for the filtering of a small fraction of the total volume of water per day, thus replacing the conventional swimming pool filtration systems which filter the totality of the water volume up to 6 times per day. The processes correspond to the timely activation (9) of the mobile suction means (3), which will simultaneously activate the filtration means (7) in order to filter the flow suctioned by the mobile suction means, filtering only a small fraction of the entire volume of water, up to 200 times less than conventional swimming pool filtration systems.

The chemical application means (6) applies or dispenses chemicals into the water. Chemical application means (6) include, but are not limited to, injectors, sprinklers, manual application, dispensers by weight, pipes, and combinations thereof.

The non-intrusive mobile suction means (3) moves along the bottom of the containing means (12), suctioning water containing settled particles and materials produced by any of the processes disclosed herein. A propelling means (4) is coupled to the mobile suction means (3) with a coupling means (5) allowing the mobile suction means (3) to travel across the bottom of the containing means (12). The coupling means (5) can be flexible or rigid. Examples of coupling means include, but are not limited to, cords, ropes, lines, cables, strings, rods, bars, poles, shafts, and combinations thereof.

The mobile suction means should not be intrusive or alter the normal development of recreational activities in the water, such as swimming or the development of water sports. Preferably, the permanence of the suction means is temporal in a zone of the water body. Thus, a system requiring fixed installations or fixed piping would be intrusive to the normal development of water sports or other activities. The mobile suction means travels across the bottom of the containing means, thoroughly suctioning the flow of water with the settled particles, and allowing visualizing the color of the bottom. The propelling means (4) drives the mobile suction means (3) by using a system such as a rail system, a cable system, a self-propelled system, a manually propelled system, a robotic system, a system guided from a distance, a boat with an engine or a floating device with an engine, or combinations thereof. In a preferred embodiment of the invention, the propelling means is a boat with an engine.

The water suctioned by the mobile suction means (3) is sent to a filtration means (7). The filtration means (7) receives the flow of water suctioned by the mobile suction means (3) and filters the suctioned water containing the settled particles and materials, thus eliminating the need to filter the totality of the water volume (e.g., only filtering a small fraction). The filtration means (7) includes, but is not limited to, cartridge filters, sand filters, micro-filters, nano-filters, ultra-filters, and combinations thereof. The suctioned water can be sent to the filtration means (7) by a collecting line (10) connected to the mobile suction means (3). The collecting line (10) can be selected from flexible hoses, rigid hoses, pipes of any material, and combinations thereof. The system can include a return line (11) from the filtration means (7) back to the containing means (12) to return the filtered water.

Figure 2:
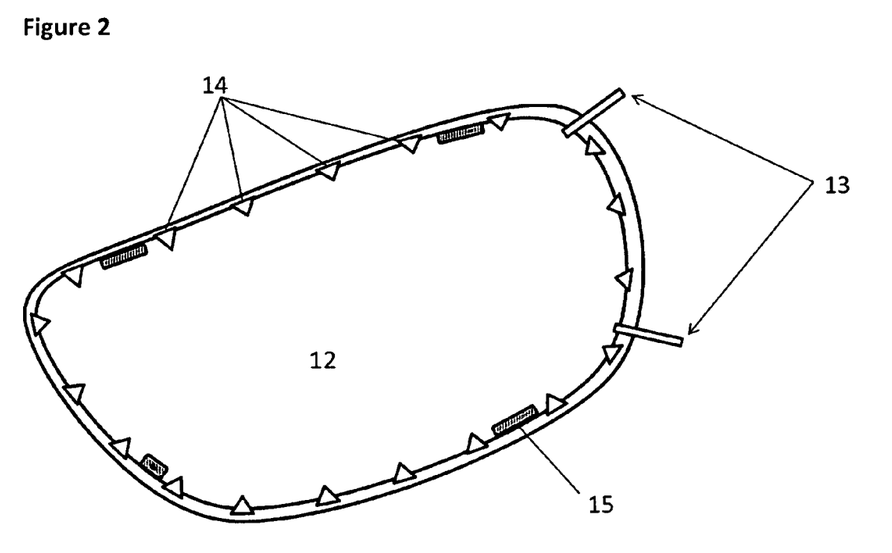
FIG. 2 shows a top view of a containing structure in an embodiment of the invention.

FIG. 2 shows a top view of a system of the invention. Containing means (12) can include a feeding pipe system (13) that allows for refilling of the containing means (12) due to evaporation or other loss of water from the containing means (12). The containing means (12) can also include injectors (14) arranged along the perimeter of the containing means (12) for applying or dispensing chemicals into the water. The containing means (12) can also include skimmers (15) for removing surface oils and particles.

In an embodiment, a system of the invention includes the following elements:
at least one inlet line (13) for feeding water to at least one containing means (12);
at least one containing means (12), which comprises a receiving means (2) for the settled particles produced by the method's processes, that is fixed to the bottom of said containing means;
at least one coordination means (1), where the coordination means timely activates the necessary processes to adjust the parameters within their limits;
at least one chemical application means (6), which allows adding the disinfectant agents to the water;
at least one non-intrusive mobile suction means (3), which moves through the bottom of said at least one containing means suctioning the water flow containing the settled particles produced by the method's processes;
at least one propelling means (4) that provides movement to said at least one non-intrusive mobile suction means so it can move through the bottom of said at least one containing means;
at least one coupling means (5), to connect said at least one propelling means and said at least one suction means;
at least one filtration means (7) that filters the water flow containing the settled particles;
at least one collecting line (10) coupled between said at least one mobile suction means and said at least one filtration means; and
at least one return line (11) from said at least one filtration means to said at least one containing means;

The method of the invention uses less chemicals and consumes less energy than traditional swimming pool treatment methods, and therefore can be performed at low costs compared to traditional treatment methods. In one aspect, the present method uses significantly less chemicals because it applies an algorithm that allows maintaining an ORP of at least 500 mV for a certain period of time depending on the temperature of the water. Thus, there is a considerable reduction on the amount of chemicals, of up to 100 times less than traditional swimming pool water treatment systems, which decreases operating and maintenance costs.

In another aspect, the methods of the invention filter only a small fraction of the total volume of water within a particular time frame compared to conventional swimming pool filtration systems which filter a much larger volume of water in the same time frame. In an embodiment, the small fraction of the total volume water is up to 200 times smaller than the flow processed in traditionally configured centralized filtration systems, which filter the totality of the water volume up to 6 times per day. The filtering means in the method and system of the invention operates at shorter periods of time due to the orders received from the coordination means. Thus the filtration means in the method and system of the invention has a very small capacity and up to 50 times lower capital costs and energy consumption compared to the centralized filtering unit used in conventional swimming pool filtration systems.

In an embodiment, the method includes the following stages:

a. Collecting water with a concentration of total dissolved solids (TDS) of up to 50,000 ppm;
b. Storing said water in at least one containing means (12), where said containing means has a bottom able to be thoroughly cleaned by a non-intrusive mobile suction means;
c. Limiting the density of bathers to be up to 0.05 bathers per cubic meter of water volume contained in said containing means.
d. Within periods of 7 days, for water temperatures up to 45 degrees Celsius, maintaining said water's ORP of at least 500 mV for a minimum period of 1 hour for each degree Celsius of water temperature, by adding disinfectant agents to the water;
e. Activating the following processes through a coordination means (1), where the processes purify the water and eliminate the suspended solids by only filtering a small fraction of the total volume of water:
  i. Suctioning the water flow that contains the settled particles, produced by the previous processes, with a non-intrusive mobile suction means (3) to prevent the thickness of the settled material from exceeding an average of 3 mm;
  ii. Filtering the flow suctioned by the mobile suction means, with at least one filtration means (7); and
  iii. Returning the filtered water to said at least one containing means, thus avoiding the filtering of the total volume of water, only filtering the flow containing the settled particles;

Disinfectant agents are applied to the water, by a chemical application means (6), in order to maintain an ORP level of at least 500 mV for a minimum period of time according to the temperature of the water, within periods of 7 days at a time. The disinfectant agents include, but are not limited to, ozone, biguanide products, algaecide and antibacterial agents such as copper products; iron salts; alcohols; chlorine and chlorine compounds; peroxides; phenolic compounds; iodophors; quaternary amines (polyquats) in general, such as benzalkonium chloride and S-Triazine; peracetic acid; halogen-based compounds; bromine based compounds, chlorine base compounds, and combinations thereof. Preferred disinfectant agents include chlorine based compounds, ozone, biguanide products, bromine based compounds, halogen based compounds, or combinations thereof.

Control of bacteria and microalgae in the body of water is achieved by the chemical application means which applies the disinfectant agents to the water body. The amount of disinfectant agents used in the present invention is at least one order of magnitude lower than the usual amounts required by traditional swimming pool technology. Application of disinfectant agents results in the death of bacteria and other microorganisms, which collect or settle in the layer of water along the bottom of the containing means. Unlike traditional swimming pool technology, disinfectant agents in the present invention are applied without the need for maintaining a permanent concentration in the water volume. The sustainable method applies an algorithm that allows maintaining ORP levels only for a certain period of time determined according to the water's temperature. If the water temperature is up to 45 degrees Celsius, an ORP level of at least 500 mV is maintained for a minimum period of 1 hour for each degree Celsius of water temperature. For example, if the water temperature is 25 degrees Celsius, then an ORP level of at least 500 mV is maintained for a minimum period of 25 hours, which can be distributed along the 7 day period. Water having a temperature greater than 45 degrees Celsius is not suitable for the recreational uses of the present invention as such temperatures could compromise the safety of the bathers.

The coordination means (1) can receive information (8) regarding the water quality parameters within their respective limits. The information received by the coordination means can be obtained by empirical methods. The coordination means (1) is also capable of receiving information, processing that information, and activating the required processes according to that information, including combinations thereof. One example of a coordination means is a computing device, such as a personal computer, connected to sensors which allow for the measuring of parameters and activation of processes according to such information.

The mobile suction means is designed to perform a thorough surface cleaning of the receiving means such that the surface color of the receiving means is visible, thereby providing the water body with an attractive color. The coordination means (1) provides information (9) to the mobile suction means (3) to activate the mobile suction means. The filtration means (7) is simultaneously activated in order to filter the flow suctioned by the mobile suction means (3), filtering only a small fraction of the entire volume of water. The filtered water is then returned to the containing means (12) by the return line (11). The mobile suction means (3) is activated (9) by the coordination means (1) to prevent the thickness of the settled material from exceeding 3 mm on average. The filtration means (7) and mobile suction means (3) operate only as needed to maintain the parameters of the water with their limits, for instance, only a few hours a day, as opposed to conventional filtration systems which operate continuously on a daily basis.

Water treated by the method of the invention can be provided by a natural water source, such as oceans, groundwater, lakes, rivers, treated water, or combinations thereof. The collected water can have a concentration up to 50,000 ppm of Total Dissolved Solids (TDS). When the concentration of TDS is less than or equal to 10,000 ppm, the Langelier Saturation Index of the water should be less than 3. For the present invention, the Langelier Saturation Index can be kept under 2 by pH adjustment, the addition of antiscalants, or a water softening process. When the concentration of TDS is higher than 10,000 ppm, the Stiff & Davis Saturation Index of the water should be less than 3. For the present invention, the Stiff & Davis Saturation Index can be maintained up to 2 by pH adjustment, the addition of antiscalants, or a water softening process. Antiscalants that can be used to maintain the Langelier Saturation Index or the Stiff & Davis Saturation Index under 2 include, but are not limited to, phosphonate based compounds, such as phosphonic acid, PBTC (phosphobutantricarboxylic acid), chromates, zinc polyphosphates, nitrites, silicates, organic substances, caustic soda, malic acid-based polymers, sodium polyacrylate, ethylene diamine tetracetic acid sodium salts, corrosion inhibitors such as benzotriazole, and combinations thereof.

EXAMPLES

For the following examples, the terms "a/an/the" include plural alternatives (at least one). The disclosed information is illustrative, and other embodiments exist and are within the scope of the present invention.

Example 1

The following table summarizes the amounts of chemicals used, energy consumed and associated costs considering a density of bathers of up to 0.05 bathers per cubic meter in A) a system according to the present invention and B) a traditional swimming pool configuration. The volume of water in both A) and B) is 90,000 m$^3$.

|  | Case A | Case B |
|---|---|---|
| Total Volume (m$^3$) | 90,000 | 90,000 |
| Filtered flow in 24 hours (m$^3$) | 2.7 | 540 |
| Chemical agents (kg) | 1.5 | 135 |
| Energy used in filtration monthly (USD) | USD 806 | USD 43000 |

As illustrated in the table, the operating cost of a pool configured with the system of the present invention will be at least one order of magnitude lower than a traditional configuration.

Example 2

A water body of 125,000 m$^3$ was treated with a method and system according to the present invention. The average depth of the body of water was 3.125 m. The system included spaced injectors as chemical application means at the border of the swimming pool and at the bottom of the structure. The cleaning system operated in cycles given the size of the water body. ORP levels were determined as follows: for water temperatures up to 45 degrees Celsius, an ORP level of at least 500 mV was maintained for a minimum period of 1 hour for each degree Celsius of water temperature. The temperature of the water was 20 degrees Celsius, so ORP levels of at least 500 mV were maintained during 20 hours during the week. On the first day of treatment, the chemical application means injected chlorine from 9:00 am to 7:00 pm to maintain chlorine concentrations of 0.15 ppm, thus completing 10 hours that day. The same procedure was repeated on the fourth day of treatment from 9:00 am to 7:00 pm, thus completing the 20 hours required for the 7 day treatment cycle.

Before the average thickness of the layer of settled material exceeded 3 mm, suctioning of the settled dead microalgae and microorganism debris was started by using a small boat with an engine as a propelling means to move a suctioning device along the bottom of the structure in a zone of the structure. The other zones were activated sequentially allowing the complete removal of dead microalgae and microorganism debris in a period of 4 hours.

The suctioned flow was sent to a small cartridge filter, since the volume filtered is a very small percentage (2.5%) of the whole volume of water per day. The filtering cartridge was located outside the swimming pool, and the filtered water was returned to the swimming pool by a flexible hose.

The energy consumed during 1 week using this configuration was 2,436 kW. In a traditional pool configuration, the calculated consumption of energy in one week would have been 124,306 kW. Therefore, the present invention consumes only a 2% of the energy and utilizes an amount of chemical agents up to 100 times lower than an equivalent swimming pool with traditional water treatment technology.

While certain embodiments of the invention have been described, other embodiments may exist. Further, any disclosed method steps or stages may be modified in any manner, including by reordering steps and/or inserting or deleting steps, without departing from the invention. While the specification includes a detailed description and associated drawings, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A sustainable method for treating and maintaining a body of water affected by bacteria and microalgae at low cost by filtering a small fraction of the total volume of the body of water, the method comprising:
   a. Collecting water with a concentration of total dissolved solids (TDS) of up to 50,000 ppm;
   b. Storing said water in at least one container, wherein said container has a bottom surface able to be thoroughly cleaned by a non-intrusive mobile suction means;
   c. Limiting the density of bathers up to 0.05 bathers per cubic meter in said water contained in said container;
   d. During a 7 day interval, treating said water in said container for a total oxidation reduction potential (ORP) treatment time during the interval by periodically adding disinfectant agents to said water to establish an ORP of about 500 mV, wherein said total ORP treatment during the interval is dependent on temperature of said water being treated and comprises a minimum period of about 1 hour for each degree Celsius (° C.) of water temperature up to a maximum temperature of 45° C.;
   e. Activating the following processes through a coordination means to purify said water and eliminate solids from said water by filtering only a small fraction of the total volume of said water in said container, wherein said coordination means receives information regarding water quality parameters controlled by said coordination means and activates processes i, ii, and iii to adjust said parameters within their limits:
      i. Suctioning a portion of said water containing settled solids with a mobile suction means to prevent the thickness of settled material from exceeding an average of 3 mm;
      ii. Filtering the portion of said water suctioned by the mobile suction means; and
      iii. Returning the filtered water to said container.

2. The method of claim 1, wherein:
   a. if the water collected in stage a) has a total dissolved solids' concentration less than or equal to 10,000 ppm, the Langelier Saturation Index must be less than 3; or
   b. if the water collected in stage a) has a total dissolved solids' concentration higher than 10,000 ppm, the Stiff & Davis Saturation Index must be lower than 3.

3. The method of claim 2, wherein the Langelier Saturation Index is kept under 2 by a process selected from pH adjustment, the addition of antiscalants, or a water softening process.

4. The method of claim 2, wherein the Stiff & Davis Saturation Index is kept under 2 by a process selected from pH adjustment, the addition of antiscalants, or a water softening process.

5. The method of claim 3, wherein the antiscalants comprise phosphonate based compounds, phosphonic acid, PBTC (phosphobutan-tricarboxylic acid), chromates, zinc polyphosphates, nitrites, silicates, organic substances, caustic soda, malic acid-based polymers, sodium polyacrylate, ethylene diamine tetracetic acid sodium salts, benzotriazole, or a combination thereof.

6. The method of claim 1, wherein the information received by said coordination means is obtained by empirical methods.

7. The method of claim 1, wherein the disinfectant agents are selected from chlorine and chlorine compounds; ozone; biguanide products; halogen-based compounds; bromine based compounds, or a combination thereof.

8. The method of claim 1, wherein the mobile suction means travels across the bottom of the containing means and suctions the portion of water containing the settled solids.

9. The method of claim 1, wherein said water is treated within the interval to establish the ORP of about 500 mV for a total treatment time during the interval that is dependent on temperature of said water being treated without maintaining a permanent concentration of disinfectant agents in the total volume of said water.

10. The method of claim 1, wherein said container comprises a volume of at least 15,000 m$^3$.

11. A sustainable method for treating and maintaining a body of water affected by bacteria and microalgae at low cost by filtering a small fraction of the total volume of the body of water, the method comprising:
   a. Collecting water with a concentration of total dissolved solids (TDS) of up to 50,000 ppm;
   b. Storing said water in at least one container, wherein said container has a bottom surface able to be thoroughly cleaned by a non-intrusive mobile suction means;
   c. Limiting the density of bathers up to 0.05 bathers per cubic meter in said water contained in said container;
   d. During a 7 day interval, treating said water in said container for a total oxidation reduction potential (ORP) treatment time during the interval by periodically adding disinfectant agents to said water to establish an ORP of at least 500 mV, wherein said total ORP treatment time is dependent on temperature of said water being treated and comprises an approximate period of about 1 hour for each degree Celsius (° C.) of water temperature up to a maximum temperature of 45° C.;
   e. Activating the following processes through a coordination means to purify said water and eliminate solids from said water by filtering only a small fraction of the total volume of said water in said container, wherein said coordination means receives information regarding water quality parameters controlled by said coordination means and activates processes i, ii, and iii to adjust said parameters within their limits:
      i. Suctioning a portion of said water containing settled solids with a mobile suction means to prevent the thickness of settled material from exceeding an average of 3 mm;
      ii. Filtering the portion of said water suctioned by the mobile suction means; and
      iii. Returning the filtered water to said container.

12. The method of claim 1, wherein said total ORP treatment time is discontinuous during the 7 day interval.

13. The method of claim 12, wherein:
   a. if the water collected in stage a) has a total dissolved solids' concentration less than or equal to 10,000 ppm, the Langelier Saturation Index must be less than 3; or
   b. if the water collected in stage a) has a total dissolved solids' concentration higher than 10,000 ppm, the Stiff & Davis Saturation Index must be lower than 3.

14. The method of claim 13, wherein the Langelier Saturation Index is kept under 2 by a process selected from pH adjustment, the addition of antiscalants, or a water softening process.

15. The method of claim 13, wherein the Stiff & Davis Saturation Index is kept under 2 by a process selected from pH adjustment, the addition of antiscalants, or a water softening process.

16. The method of claim 14, wherein the antiscalants comprise phosphonate based compounds, phosphonic acid, PBTC (phosphobutan-tricarboxylic acid), chromates, zinc polyphosphates, nitrites, silicates, organic substances, caustic soda, malic acid-based polymers, sodium polyacrylate, ethylene diamine tetracetic acid sodium salts, benzotriazole, or a combination thereof.

17. The method of claim 12, wherein the information received by said coordination means is obtained by empirical methods.

18. The method of claim 12, wherein the disinfectant agents are selected from chlorine and chlorine compounds; ozone; biguanide products; halogen-based compounds; bromine based compounds, or a combination thereof.

19. The method of claim 12, wherein the mobile suction means travels across the bottom of the containing means and suctions the portion of water containing the settled solids.

20. The method of claim 12, wherein said water is treated within the interval to establish the ORP of at least 500 mV for a total treatment time during the interval that is dependent on temperature of said water being treated without maintaining a permanent concentration of disinfectant agents in the total volume of said water.

21. The method of claim 12, wherein said container comprises a volume of at least 15,000 m$^3$.

22. The method of claim 12, wherein said total ORP treatment time is discontinuous during the 7 day interval.

* * * * *